US007421109B2

(12) United States Patent
Tsuchiya et al.

(10) Patent No.: US 7,421,109 B2
(45) Date of Patent: Sep. 2, 2008

(54) PATTERN INSPECTION APPARATUS

(75) Inventors: Hideo Tsuchiya, Kawasaki (JP); Kyoji Yamashita, Yokohama (JP); Toshiyuki Watanabe, Yokohama (JP); Ikunao Isomura, Yokohama (JP); Toru Tojo, Naka-gun (JP); Yasushi Sanada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 814 days.

(21) Appl. No.: 10/642,760

(22) Filed: Aug. 19, 2003

(65) Prior Publication Data
US 2004/0105578 A1    Jun. 3, 2004

(30) Foreign Application Priority Data
Aug. 21, 2002 (JP) .............................. 2002-240858

(51) Int. Cl.
  G06K 9/00 (2006.01)
  G01B 11/00 (2006.01)
  G01J 1/10 (2006.01)
(52) U.S. Cl. ....................... 382/144; 382/218; 356/394; 356/237.4; 348/130
(58) Field of Classification Search ................. 382/145, 382/144, 149, 318, 147, 270, 199, 151, 218; 250/208.1, 548, 559.4; 356/394, 390, 237.1, 356/237.4; 716/19, 21; 348/126, 130, 61, 348/125, 129
See application file for complete search history.

(56) References Cited

U.S. PATENT DOCUMENTS 5,173,719 A * 12/1992 Taniguchi et al. .......... 356/394
6,040,911 A *  3/2000 Nozaki et al. .............. 356/394
6,084,716 A *  7/2000 Sanada et al. .............. 359/629
6,603,875 B1 * 8/2003 Matsuyama et al. ........ 382/145
7,127,126 B2 * 10/2006 Sakai et al. ................ 382/294

FOREIGN PATENT DOCUMENTS

JP          63-17523          1/1988

(Continued)

OTHER PUBLICATIONS

Haruo Yoda et al., "repeating pattern defect detection device", Nov. 1, 1984 United States Patent and Trademark Office, Washington, D.C. Mar. 2007. pp. 1-21.*

(Continued)

Primary Examiner—Sheela Chawan
(74) Attorney, Agent, or Firm—Oblon, Spivak, McClelland, Maier & Neustadt, P.C.

(57) ABSTRACT

A pattern inspecting method, comprising preparing a sample having a first and a second inspection regions and an imaging device having a plurality of pixels, scanning the first inspection region to a first direction using the imaging device to obtain a first measurement pattern representing at least parts of the first inspection region, scanning the second inspection region to the first direction using the imaging device to obtain a second measurement pattern representing at least parts of the second inspection region, comparing the first measurement pattern and the second measurement pattern with each other to determine presence or absence of a defect formed on the sample, and controlling a scanning condition for scanning a pattern of the second inspection region by the imaging device so as to keep the same with the scanning condition when the pattern of the first inspection region is scanned by the imaging device.

9 Claims, 9 Drawing Sheets

FOREIGN PATENT DOCUMENTS

| | | |
|---|---|---|
| JP | 3-270249 | 12/1991 |
| JP | 6-265480 | 9/1994 |
| JP | 8-250569 | 9/1996 |
| JP | 10-104168 | 4/1998 |
| JP | 2002-141384 | 5/2002 |

OTHER PUBLICATIONS

U.S. Appl. No. 10/106,344, filed Mar. 27, 2002, Nakashima et al.
U.S. Appl. No. 10/642,760, filed Aug. 19, 2003, Tsuchiya et al.
U.S. Appl. No. 10/720,136, filed Nov. 25, 2003, Isomura et al.
U.S. Appl. No. 10/743,830, filed Dec. 24, 2003, Tsuchiya et al.

* cited by examiner

Inspection data item:
Threshold level of defect or not
   Discrimination condition a:
   Discrimination condition b:
   Discrimination condition c:

Illumination method of transmitted/reflected light:
Magnification mode of optics in inspection
Alignment-related information
: : : :
: : : :
Inspection mode of die-to-die combined with die-to-database (ON/OFF)
Start point coordinates of die 1(x1, y1):
Finish point coordinates of die 1(x2, y2):
Start point coordinates of die 2(x3, y3):
Finish point coordinates of die 2(x4, y4):

FIG. 6

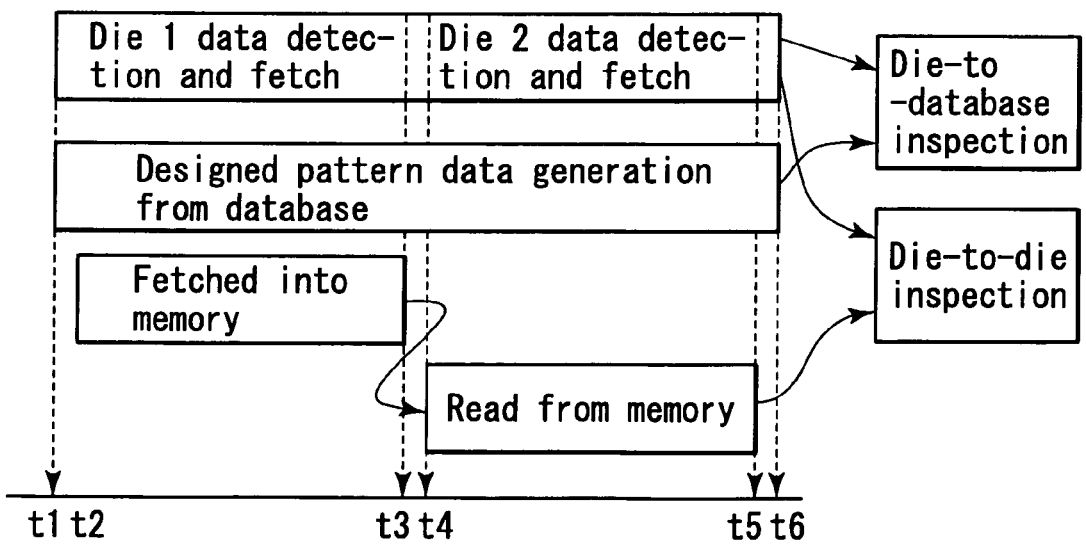

FIG. 7

PATTERN INSPECTION APPARATUS

CROSS-REFERENCE TO RELATED APPLICATIONS

This application is based upon and claims the benefit of priority from the prior Japanese Patent Application No. 2002-240858, filed Aug. 21, 2002, the entire contents of which are incorporated herein by reference.

BACKGROUND OF THE INVENTION

1. Field of the Invention

The present invention relates to a pattern inspection apparatus for inspecting pattern defects of a plate to be inspected where micropatterns are formed, e.g., a photomask used in a manufacturing process of a semiconductor integrated circuit.

2. Description of the Related Art

A pattern size of a large-scale-integrated circuit (LSI) has been reduced more and more in recent years, and it is expected that products having minimum line widths of 0.1 μm or lower will be mass-produced in the near future. Such downsizing has been accompanied by an extremely small defect dimension to be detected, which makes it essential to develop a pattern inspection apparatus for inspecting patterns of an LSI, and pattern defects of a transfer mask used for LSI manufacturing.

Conventional pattern inspection methods are mainly classified into die-to-die comparison, in which two chips of similarly written patterns are observed by different detectors, and a difference between the two is detected by comparison based on a defect detection algorithm, and die-to-database comparison, in which a chip of a written pattern is observed by a detector, which is then compared with designed pattern data by a defect detection algorithm to detect a defect.

In the die-to-die comparison method, since the two chips of the similarly written patterns are observed, there is a drawback of impossible detection of the defects if similar defects are present. On the other hand, in the case of the die-to-database method, even if no such problem occurs because of the comparison with the designed pattern data, there is a drawback of noncoincidence between detected image data and reference pattern image data, which causes false defects. Consequently, highly sensitive and highly accurate inspection is difficult.

Thus, the die-to-die comparison method and the die-to-database comparison method have advantages and disadvantages, and there is a demand for an inspection apparatus which can combine these methods well. However, in the case of combining the two methods, the following problems occur, especially when the die-to-die comparison method is used.

That is, since there is variance in dimensions of dicing portions between chips on a mask to be inspected and there is no repeated pattern in a peripheral pattern portion, it is impossible to carry out a simple step of obtaining a dimension of one chip at equal distribution. Thus, it is necessary to teach a repetition start position of the chip to the apparatus by an operator's operation based on an instruction manual. At present, by using feature pattern shapes, the operator visually verifies a start position, a finish position etc., of each chip. Consequently, operation mistakes by the operator and setting variance easily occur, which leads to a problem of reduction in inspection accuracy.

Therefore, there is a demand for a pattern inspection apparatus which can prevent operation mistakes by the operator and setting variance in the die-to-die comparison method, and improve operability and inspection accuracy.

BRIEF SUMMARY OF THE INVENTION

A pattern inspection apparatus of the present invention comprises:

imaging optics which forms an optical image of a pattern formed on a plate to be inspected based on designed pattern data;

a detected pattern data generator which detects the optical image to generate detected pattern data;

a reference pattern data generator which generates first reference pattern data regarding the detected pattern data from the designed pattern data;

a first comparator which compares the detected pattern data with the first reference pattern data to detect a defect of the pattern formed on the plate;

a first memory which, when there are a plurality of repeated pattern areas on the plate, stores pattern data obtained by detecting an inspection area, which is one of the plurality of repeated pattern areas, as second reference pattern data;

a second comparator which compares the detected pattern data with the second pattern data to detect the defect of the pattern formed on the plate; and a computer which reads an arrangement, a number, a dimension and a repeated pitch of the plurality of repeated pattern areas from the designed pattern data, and stores the inspection area as a basis of the second reference pattern data.

In the reference pattern data generator, detected pattern data within an arbitrary range may be used in place of the designed pattern data to generate first reference pattern data regarding the detected pattern data.

BRIEF DESCRIPTION OF THE SEVERAL VIEWS OF THE DRAWING

FIG. 6 is a view showing a configuration example of an inspection condition file.

FIG. 7 is a time chart explaining an inspection step for one stripe to be inspected.

DETAILED DESCRIPTION OF THE INVENTION

Next, the embodiments of the present invention will be described with reference to the accompanying drawings.

First Embodiment

Figure 1:
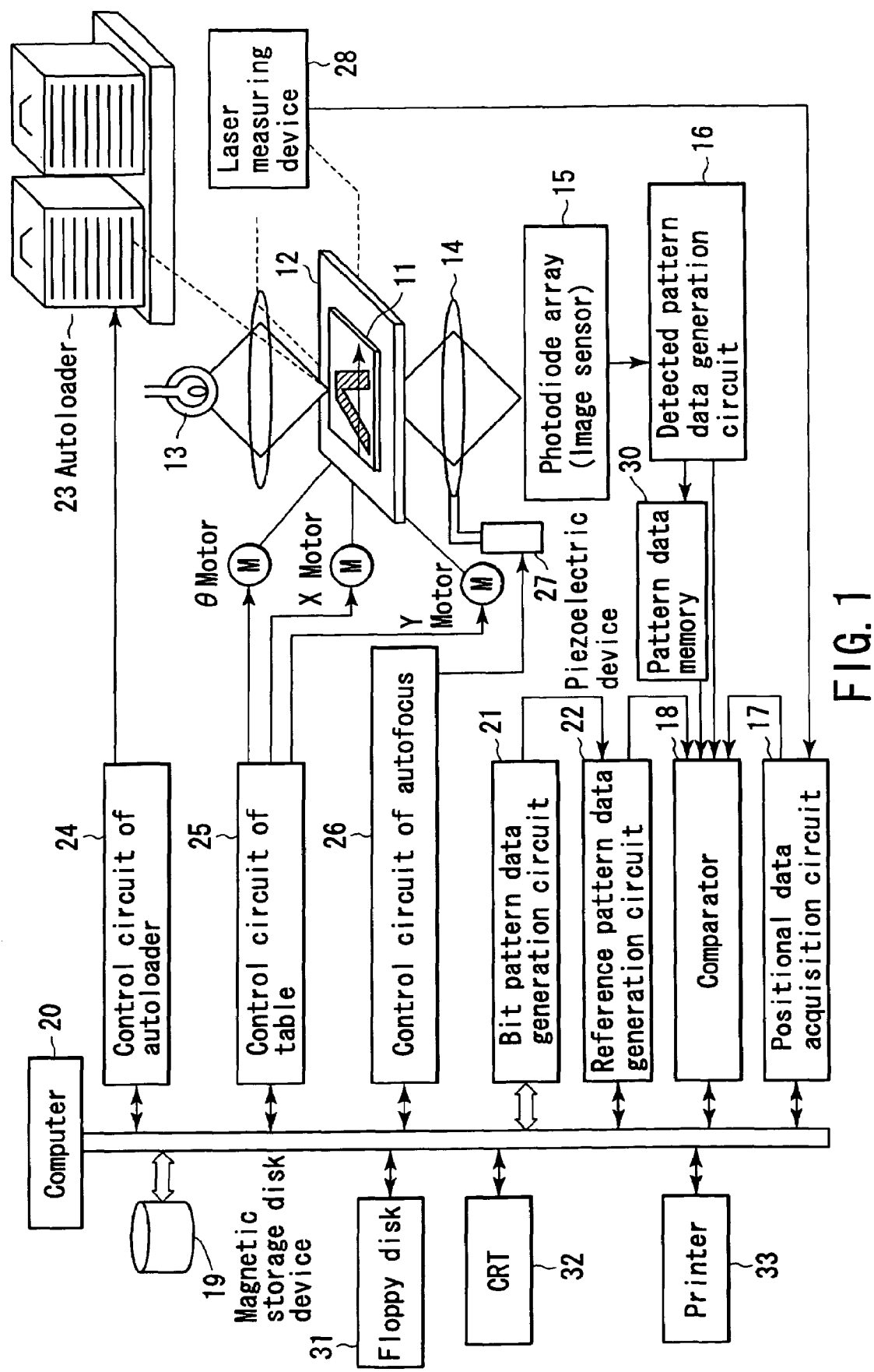
FIG. 1 is a schematic view of a pattern inspection apparatus according to a first embodiment.

FIG. 1 is a schematic configurational view showing a pattern inspection apparatus according to a first embodiment of the present invention.

In this apparatus, a microscope or the like is used to enlarge a pattern formed on a photomask (plate to be inspected) 11, the enlarged pattern is divided into narrow stripes of about 200 μm in width, and inspection is carried out by continuously scanning the stripes (actually a table is continuously moved).

The photomask 11 is placed on an XYθ table 12, and moved in XYθ directions by a movement of the table 12. A light source 13 is arranged above the mask 11, and the pattern formed on the mask 11 is illuminated by the light source 13. Light transmitted through the mask 11 is made incident through magnification optics 14 on a photodiode array 15. Thus, an optical image of the pattern of the mask 11 is formed on the photodiode array 15.

The optical image of the pattern formed on the photodiode array 15 is subjected to photoelectric conversion by the photodiode array 15, and further subjected to A/D conversion by a detected pattern data generation circuit 16. Detected pattern data outputted from the detected pattern data generation circuit 16 is sent together with data indicating a position of the photomask 12 on the XYθ table 12 outputted from a positional data acquisition circuit 17 to a comparator 18.

On the other hand, designed pattern data used to form the pattern on the photomask 11 is read from a magnetic storage disk 19 to a bit pattern data generation circuit 21 by a computer 20. At the bit pattern data generation circuit 21, the designed pattern data is converted into bit pattern data, which is sent to a reference pattern data generation circuit 22.

The bit pattern data is obtained by converting figure data into 2-dimensional bit image pattern data.

At the reference pattern data generation circuit 22, multi-value reference pattern data is generated by executing filter processing for the figure bit pattern data send from the bit pattern data generation circuit 21. The filter processing at the reference pattern data generation circuit 22 simulates resolution characteristics of the magnification optics 14, aperture effects of the photodiode array 15, and blurs caused by interference or the like between adjacent pixels. That is, since the detected pattern data obtained from the detected pattern data generation circuit 16 is in such a blur generated state, the designed pattern data is subjected to filter processing to match the detected pattern data.

The comparator 18 compares the detected pattern data with reference pattern data in accordance with an algorithm, and determines presence of a defect if there is no coincidence between the data.

Figure 2:
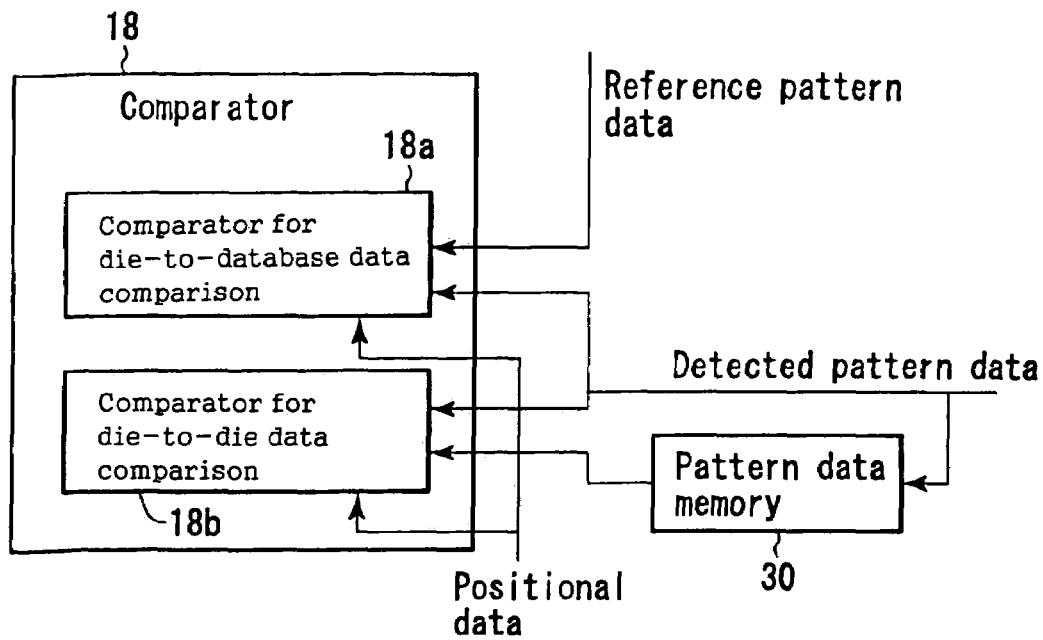
FIG. 2 is a block diagram showing a configuration of a comparator used in the pattern inspection apparatus of FIG. 1.

According to the embodiment, in addition to the aforementioned configuration, a route is formed between the detected pattern data generation circuit 16 and the comparator 18 to supply data through a pattern data memory 30. In the comparator 18, as shown in FIG. 2, a comparator for data comparing method of die-to-die (die-to-die comparator) 18a and a comparator for data comparing method of die-to-database (a die-to-database comparator) 18b are disposed. Reference pattern data (first reference pattern data) obtained by the reference pattern data generation circuit 22, and detected pattern data obtained by the detected pattern data generation circuit 16 are entered to the die-to-die comparator 18a. The currently detected pattern data and second reference pattern data, which is the formerly detected pattern data temporarily stored in the pattern data memory 30 and is read out after predetermined conditions are established, are entered to the die-to-database comparator 18b.

The comparator 18 has two inspection modes: a die-to-database data comparison method which compares the detected pattern data with the first reference pattern data, and a die-to-die data comparison method which compares the detected pattern data with the second reference pattern data. One of these methods is carried out, or both are simultaneously carried out.

The pattern data memory 30 has a capacity to store a detected image of a total stripe length during stripe inspection. Additionally, it is configured to enable, even in the middle of pattern storage during the stripe inspection, concurrent execution of reading a first half pattern of the stripe which has been stored and writing a latter half pattern of the stripe which is newly obtained.

In the drawing, a reference numeral 23 denotes an autoloader, 24 a control circuit of an autoloader, 25 a controller of a table, 26 a control circuit of an autofocus, 27 a piezoelectric device, 28 a laser measuring device, 31 a floppy disk, 32 a CRT, and 33 a printer.

In such a configuration, the computer 20 stores designed pattern data used for forming a certain number of plates to be inspected. When inspection of a given plate (exposure mask) is instructed by an apparatus operator or certain programs, the computer 20 starts analysis of relevant designed pattern data, further extracts the chip arrangement data, the number of chips, a chip dimension, a repeated pitch etc., upon discriminating that the mask is formed of a plurality of chips and the die-to-database comparator can be used in combination with the die-to-die comparator. The computer 20 further sets data necessary for a parameter table of software, a register of hardware etc., and enters in an operation mode which uses the die-to-die data comparison method and the die-to-database data comparison method in combination.

Figure 3:
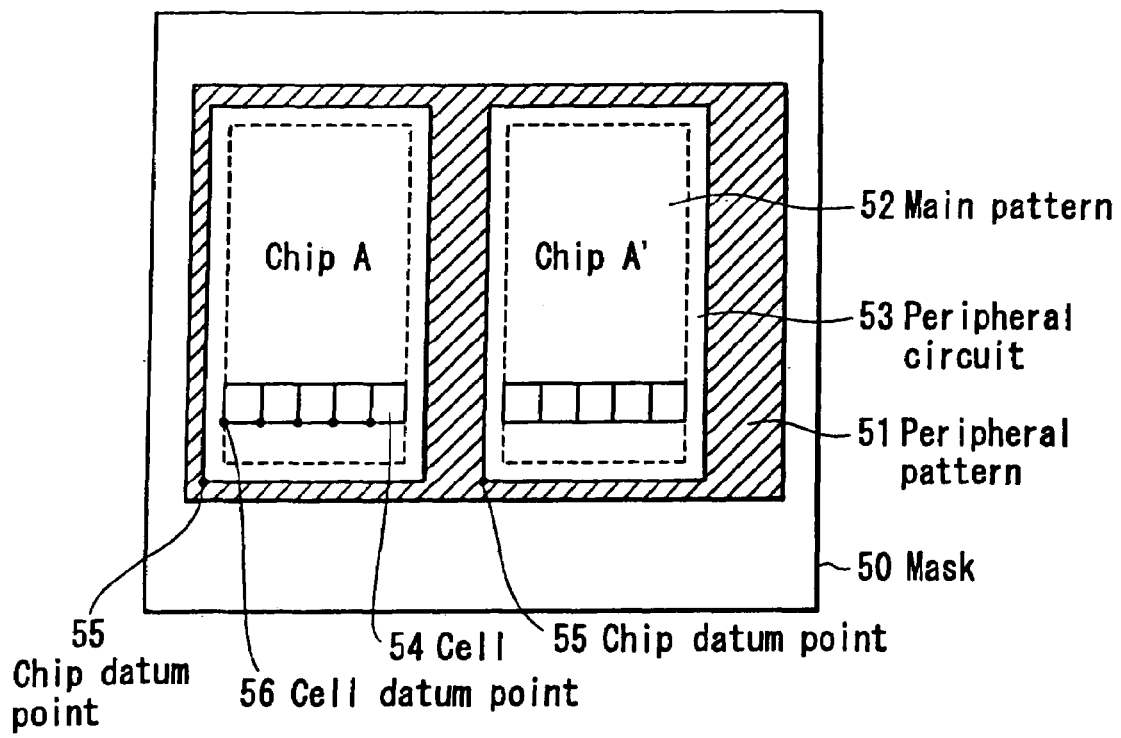
FIG. 3 is a plan view schematically showing a configuration of a pattern written on an inspection mask.

FIG. 3 is a conceptual view showing a configuration of a pattern written on a general mask to be inspected. Two identical chips are written on one mask 50 (photomask 11), and a repeated pattern is written in the chip in units of so called cell. The pattern formed on the mask 50 is divided into a peripheral pattern 51 and a main pattern 52. The main pattern 52 is further divided into a logic control part (peripheral circuit) 53 and a memory part (cell) 54. In the drawing, reference numeral 55 denotes a chip datum point, and 56 a cell datum point.

In the case of such a two-chip configuration, the chips are generally arranged in a relation where they are in parallel in an X or Y direction. In the case of 4 or 6 chips formed on one mask, though not shown, the chips are repeatedly arranged in X and Y directions, to form a matrix.

The embodiment will be described by way of a case where identical chips A are arranged on two places in a longitudinal direction of a stripe to be inspected. For convenience, a first chip is represented as A, and a second chip as A'. If the mask is formed of a plurality of chips as described above, upon discriminating that the die-to-die data comparison method can be used in combination with the die-to-database data comparison method, database inspection is first carried out from a start point of the chip A while a sensor image is stored from a stripe head in the pattern data memory 30. The database inspection is carried out up to a boundary point between the chips A and A', which is pre-extracted and determined. However, in a latter half of the stripe after the boundary point, the die-to-die data comparison method is used in combination with die-to-database data comparison method to compare a detected image subsequently fetched from the sensor with the pattern image of the first half of the stripe which has been stored in the pattern data memory 30.

In this case, it is necessary to accurately detect the coordinates of the start point of the chip A and the boundary point between the chips A and A', and to so accurately align chips (dies) as necessary for the die-to-die data comparison method.

In the pattern inspection apparatus of the embodiment, a step of specifying a coordinate is automatically executed by utilyzing features on data description configuration of the designed pattern data. On the contrary, in a conventional method, an operator has carried out the step by using observation optics such as a microscope to visually check the mask to be inspected.

Figure 4:
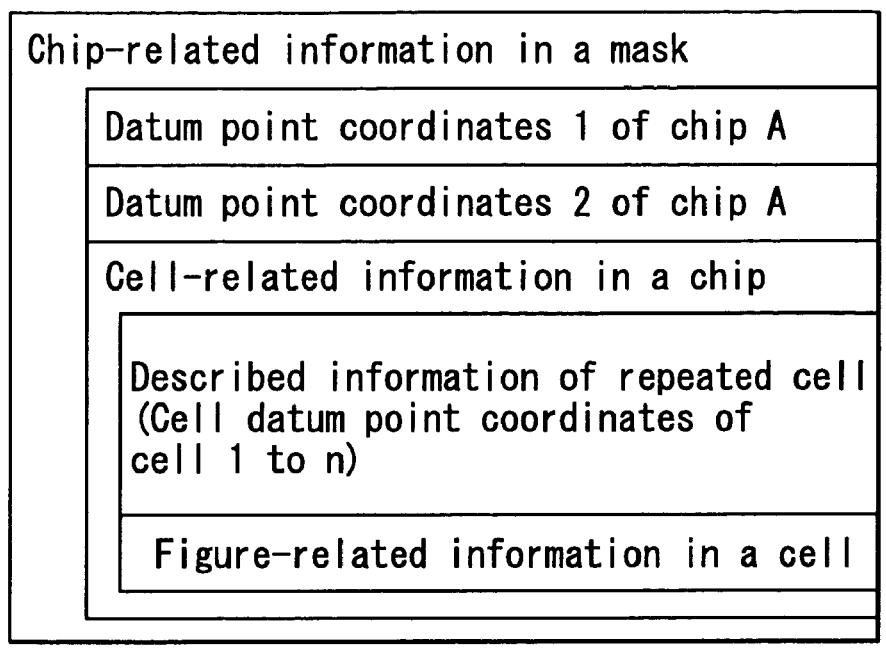
FIG. 4 is a conceptual view showing a hierarchical structure of designed pattern data.

As shown in FIG. 4, the designed pattern data has a hierarchy structure with respect to chip and cell definitions. In this example, as shown in FIG. 3, an arrangement coordinate of a chip is defined as a left bottom point of the chip. In such a data structure, from the situation of the arrangement coordinate, two-place arrangement of the chips on the mask can be read by detecting "datum point coordinates 1 of chip A" and "datum point coordinates 2 of chip A".

Thus, the following coordinates are automatically recognized without teachings of the operator, that is, a start coordinate of the die-to-database inspection and fetching of an image of the chip A at the same time, a start coordinate of the die-to-die inspection at the boundary point of the chip A' executed in parallel with the die-to-database inspection, and a finish coordinate of one stripe inspection after an area of the chip A' is finished.

The comparator 18 detects defects in the area of the chip A' by both of the original die-to-database data comparison method and the die-to-die data comparison method. However, it is advised to apply defect discrimination conditions and threshold levels of defect or not to the two data comparison method, independently. Thus, defects common to the plurality of chips caused by writing abnormalities due to a writing device can be detected by the die-to-database data comparison method, while defects caused by line width abnormalities of micropatterns or the like, detection of which are supposed to be difficult in the die-to-database data comparison method, can be detected by the die-to-die data comparison method. As a result, it is possible to realize detection performance which has been impossible by a conventional single function apparatus of the die-to-database data comparison method and the die-to-die data comparison method.

The idea of the embodiment to automate the coordinate recognition when the die-to-database data comparison method and the die-to-die data comparison method are used in combination is not limited to the aforementioned case of the two-chip arrangement, and can be applied to a mask where three or more repeated arrangements of the chips are defined. Further, the repeated feature extraction is not limited to the longitudinal direction of the stripe in the inspection step, and can also be applied to the arrangement where the chips are arranged by a plurality of times in a step direction, in such a manner that the apparatus is automatically operated by similarly fetching arrangement information, a start position and a finish position in the stage stepping direction from the designed pattern data.

Next, the defect inspection operation of the embodiment will be described in more detail.

The hierarchy structure of the database for the plate to be inspected according to the embodiment is composed of three stages: minimum unit figures, cells each of which is an aggregate of individual figures, a chip of an aggregate of cells etc. One or a plurality of chips may be arranged in the mask. In the case of arranging a plurality of chips, similar chips may be arranged on a plurality of places, or different chips may be arranged on a plurality of places.

Inspection by the die-to-die comparison method of the embodiment targets the similar chips arranged on the plurality of places. Since a plurality of chips are arranged on one mask, and the chips are compared with one another, "die" and "chip" are the same in the case of the die-to-die data comparison method. The chip can be divided into a peripheral circuit part and a main pattern part. However, to compare the two chips with each other, discrimination between the peripheral circuit part and the main pattern part is not necessary, and the entire chip is recognized as a repeated shape to be processed.

Figure 5:
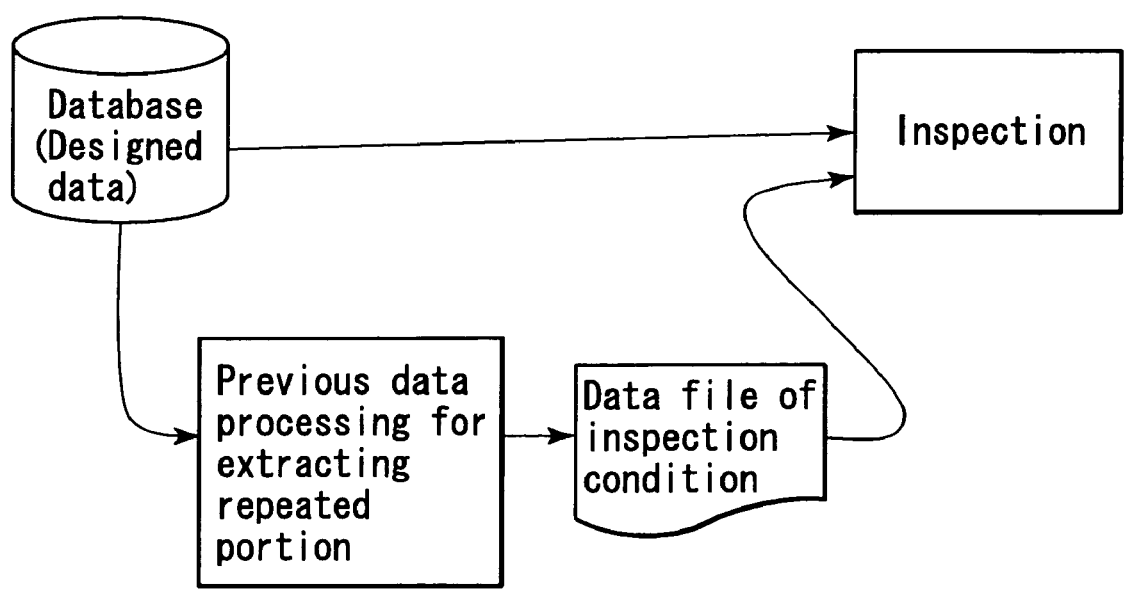
FIG. 5 is a conceptual view showing a flow of a preprocessing step for extracting a repeated description.

The database used for inspection is designed pattern data used for writing. Prior to inspection, a step shown in FIG. 5 is carried out to read the number of chips, a chip dimension, a repeated chip pitch, or the number of cells, a cell dimension, a repeated cell pitch etc., and to write the information in the data file of inspection conditions to define the operation of the inspection apparatus.

The data file of inspection conditions describes, for each execution of inspection, a defect threshold of the inspection, an illumination method of transmitted/reflected light, a magnification mode of inspection etc. An inspection execution program is operated by referring to the file together with the database. FIG. 6 shows an example of the data file of inspection conditions. As shown in FIG. 6, inspection conditions are enumerated item by item to be specified for each inspection. If a flag is ON on an inspection mode of die-to-die combined with die-to-database (ON/OFF), i.e., die-to-die inspection should be carried out in combination with die-to-database inspection, the inspection apparatus starts previous data preprocessing for extracting repeated features of a die, analyzes start/finish coordinates of each die, and writes coordinate values in a predetermined part of the data file of inspection conditions, i.e., lower 4 lines of FIG. 6.

In addition to the data file of inspection conditions, the inspection execution program refers to a parameter table of software provided on the computer, and an information table to be written in a register of the inspection apparatus hardware etc. Upon setting them, the inspection apparatus enters an operation mode of using the die-to-die comparison method and the die-to-database comparison method in combination.

FIG. 7 is a time chart explaining an inspection step for one stripe in the inspection apparatus of the embodiment. It is assumed that in the exemplified chip configuration of the mask to be inspected, two chips are arranged in the longitudinal direction (X direction) of the stripe, as shown in FIG. 3. Further, the exemplified stripe is beforehand specified to be subjected to die-to-die inspection, and even before a die extraction step prior to the start of inspection, the execution of die-to-die inspection is to be determined.

An interval to enable die-to-die inspection is from time t4 to t5. Die-to-database inspection is carried out over the entire time period t1 to t6. The die-to-database inspection is started from the time t1 and, at and after the time t2, a detected image of a die 1 is also fetched into the pattern data memory 30. When the inspection reaches so called dicing region, which is a boundary of the chips (dies) at the time t3, the fetching into the pattern data memory 30 is completed. To carry out the die-to-die inspection at the time t4, a detected pattern image of a die 1 is read from the pattern data memory 30, and input to the die-to-die comparator 18b.

Figure 8:
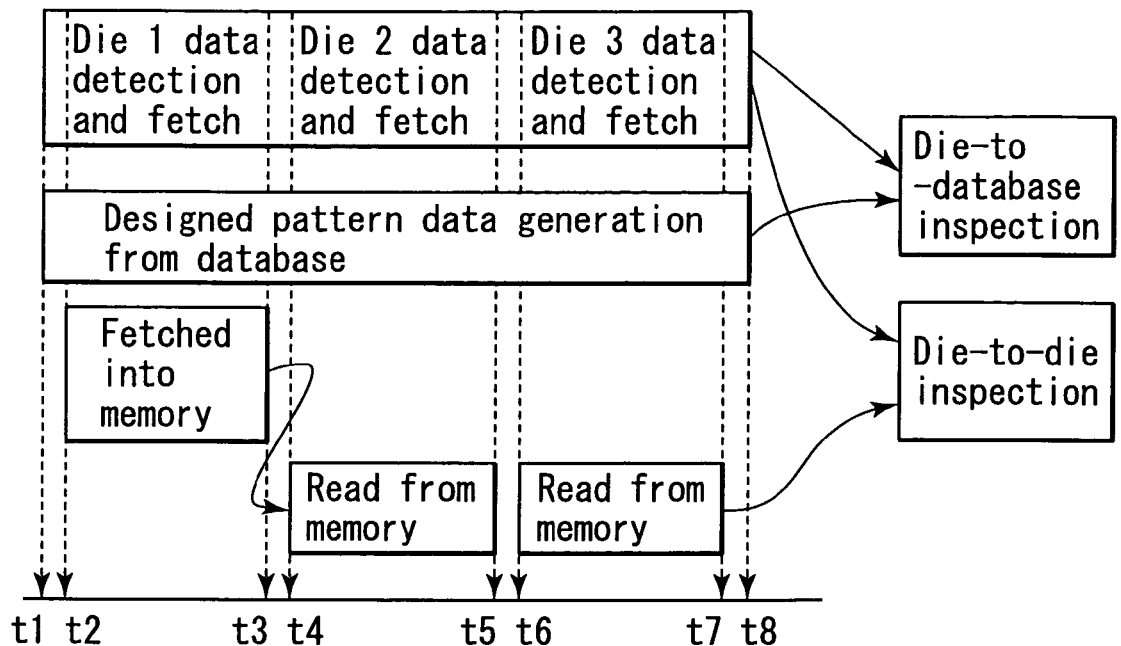
FIG. 8 is another time chart explaining an inspection step for one stripe to be inspected.

FIG. 8 is a time chart explaining an inspection step of one stripe to be inspected when three chips are arranged in the longitudinal direction (X direction) of the stripe in the inspection apparatus of the embodiment.

Die-to-database inspection is carried out over the entire period of time t1 to t6. The die-to-database inspection is started from the time t1 and, at and after the time t2, a detected image of the die 1 is also fetched into the pattern data memory 30. When the inspection reaches so called a dicing region, which is a boundary of chips (dies), at the time t3, the fetching into the pattern data memory 30 is completed. To carry out the die-to-die inspection with a die 2 at the time t4, the previous detected pattern image of the die 1 is read from the pattern data memory 30, and input to the die-to-die comparator 18b. At the time t5, the die-to-die data comparison between the die 2 and the die 1 is finished. To carry out the die-to-die inspection between the die 3 and the die 1 at the time t6, the previously detected pattern image of the die 1 is read again from the pattern data memory 30, and input to the die-to-die comparator 18b. At the time t7, the die-to-die comparison between the die 3 and the die 1 is finished.

Thus, it is a feature of the embodiment that the die-to-database data comparison method and the die-to-die data comparison method are used in combination during detected data fetching of the stripe to be inspected, while there is a slight time difference between the timing of starting the die-to-database data comparison and the timing of carrying out the die-to-die data comparison.

Figure 9:
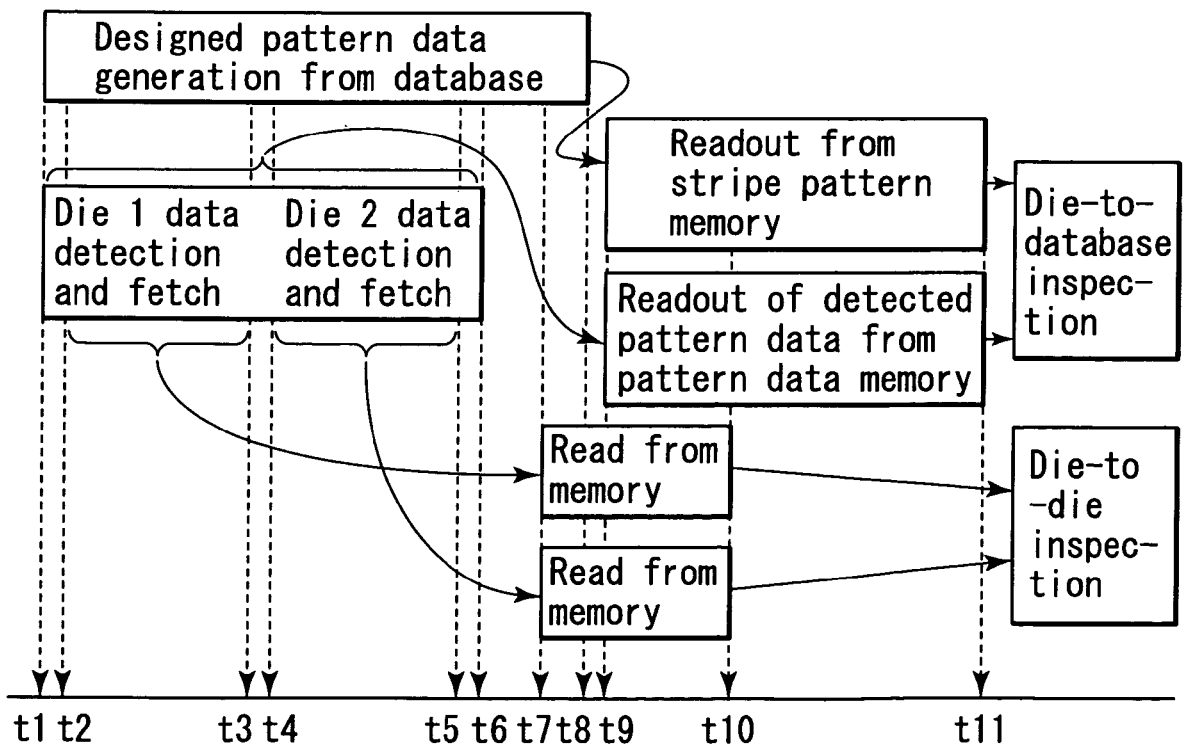
FIG. 9 is another time chart explaining an inspection step for one stripe to be inspected.

Further, for example, in order to deal with a case where it takes time to generate designed pattern data from a database, the die-to-database data comparison method may be executed not in synchronization with the detected data fetching of the stripe to be inspected. That is, as shown in a time chart of FIG. 9, at time t1, pattern fetching of one stripe to be inspected and designed pattern data generation from the database are started, and a stripe pattern is entirely read into the pattern data memory 30. It is assumed that the pattern fetching of one stripe to be inspected is finished at time t6, but designed pattern generation from the database carried out at the bit pattern data generation circuit 21 takes time, e.g., until time t8. The designed pattern data generated from the database at the bit pattern data generation circuit 21 is obtained by generating a figure pattern from figure data, and its pattern data can be temporarily stored in a stripe pattern data memory present in the bit pattern data generation circuit 11.

Since the pattern fetching of one stripe to be inspected is finished at the time t6, the die-to-die data comparison can be started at the time t7. The die-to-database data comparison is started at time t9 after the designed pattern data generation from the database is finished, and finished at time t11. When the designed pattern data is read from the database, since the designed pattern data generation has been finished, the period of t9 to t11 is shorter than that of t1 to t8.

Thus, according to the embodiment, by reading the arranged state, the number, the dimension and the repeated pitch of repeated pattern areas necessary for the die-to-die data comparison method from the designed pattern data to automatically fetch the inspection area, it is possible to eliminate operator's operation mistakes and setting variance in the die-to-die data comparison method. Thus, operability and defect detection performance of the apparatus can be improved. As a result, production yield of an exposure mask, a semiconductor device and an LCD is improved, and product returns are reduced to lower total production costs.

Second Embodiment

The first embodiment has been described by way of example where the repetition of a relatively large area called a chip is extracted and the repetitive features are automatically reflected on the operation of the apparatus. Incidentally, as exemplified by the layout of the mask in FIG. 3, repeated description of a plurality of units (cells) is often included in one chip. For example, in the case of a memory device called D-RAM or S-RAM, it is usual that a number of cell structure portions for memory holding are arranged, and wiring patterns of signal input/output to these cells are arranged on the periphery of the cell portion.

For such repeated cells in the chip, the inspection apparatus can automatically read the repeated cells from the database described in the hierarchy structure, and fetch it into the operation conditions thereof. That is, the arranged state, the number, the dimension and the repeated pitch of cells are read from the information described regarding the repeated cells in FIG. 4.

The example of the first embodiment is about the repetition of the relatively large area called a chip. However, the apparatus of the second embodiment described here inspects relatively many cells of a repeated structure by a die-to-die data comparison method.

Figure 10:
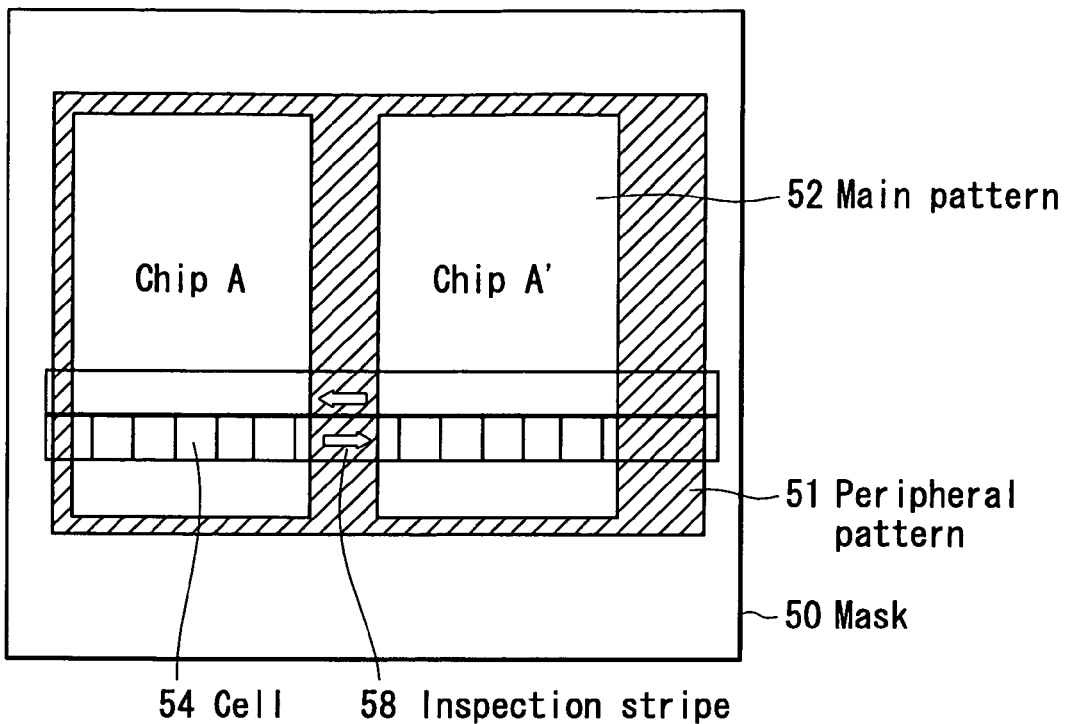
FIG. 10 is a view showing a stripe example of a pattern written on a mask to be inspected according to a second embodiment.

When a stripe 58 similar to that shown in FIG. 10 is inspected, a fetched image of a first cell in a chip A is inspected by a die-to-database data comparison method while being stored in a pattern data memory 30 and, for a second cell of the chip A, a die-to-die data comparison method is used in combination with the die-to-database data comparison method to compare the fetched image with the first cell pattern previously stored in the pattern data memory 30.

As in the previous embodiment, according to the present embodiment, during the period of combined use of the comparison methods, a comparator 18 detects defects by the original die-to-database data comparison method and the die-to-die data comparison method, and it is advised to apply defect discrimination conditions and threshold levels of defect or not different from each other to the two methods, independently.

The operation is continued for the stripe 58 by using the die-to-die data comparison method in combination with the die-to-database data comparison method to compare the cells with each other, at and after the second cell of the chip A. However, a portion which is not a cell, e.g., a boundary portion between the chip A and the chip A' of FIG. 10 is inspected only by the die-to-database comparison method.

Extraction of coordinates is carried out by a computer 20. When inspection of a certain plate (exposure mask) is instructed, the computer 20 starts analysis of relevant designed pattern data. If it is determined that a feature such as a cell repeated definition is present in a relevant mask, data description has a hierarchy structure, and the die-to-die data comparison method can be used in combination with the die-to-database data comparison method, the arranged state, the number, the dimension and a repeated pitch etc., of cells are further extracted. Additionally, the computer 20 sets necessary information in a parameter table of software and a register of hardware, and the processing enters an operation mode which uses the die-to-die data comparison method and the die-to-database data comparison method in combination.

Similarly to the previous embodiment, the extraction of repeated features is not limited to the longitudinal direction of the stripe in the inspection step, but cells may be repeatedly arranged in a step direction. Even within a stripe width, if small cells are repeatedly arranged in the step direction, the die-to-die data comparison method can be operated in a 2-dimensional matrix in the step direction and the longitudinal direction of the stripe in units of the small cell pattern.

Third Embodiment

Figure 11:
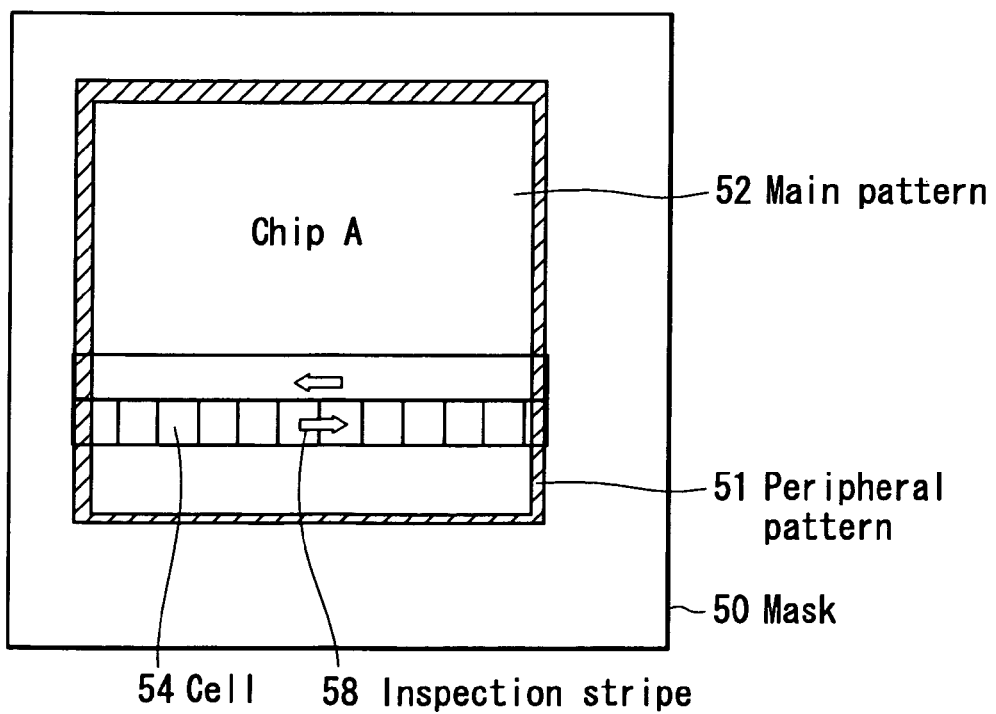
FIG. 11 is a schematic view showing a pattern configuration where only one chip is arranged on one mask according to a third embodiment.

The first and second embodiments have been described by way of example where the plurality of chips are arranged on one mask. However, one chip may be arranged on the mask. The following two cases are conceivable for one chip arrangement:

(1) as shown in FIG. 11, one mask is designed to have only one chip; and (2) a plurality of chips are originally arranged on a mask, but a hierarchy structure is destroyed in the preprocessing step of inspected data, and thus the mask is described as one chip by appearance.

In the case (1) of original one mask=one chip designing, as described above with reference to the second embodiment, the die-to-die comparison method may be carried out in units of cell by paying attention to the repeated cells.

However, in the case (2), the data structure shown in FIG. 4 has no descriptions of "datum point coordinates 1 of chip A" and "datum point coordinates 2 of chip A". This state is generated when a hierarchy structure is flatly developed in order to carry out certain preprocessing for the entire designed pattern data, such as pattern dimension resizing (processing for adjusting pattern line width) or adding a very small figure pattern to the original pattern for an optical proximity correction (OPC).

Depending on the preprocessing, there are a case where a chip hierarchy structure is developed while the repeated cells are left intact, and a case where flat operations are conducted to develop the repeated cells and figure descriptions in a cell are arrayed. To process such data by the apparatus, the following work enables combined use of the die-to-die comparison method which uses the repeated pattern and the die-to-database comparison method as in the first embodiment. One such work is to restore repeated cell information by extracting repeated figures on the grounds that figures having similar figure codes and side lengths repeatedly appear in the designed pattern data, and pitches thereof are equal, etc. Other work is to restore repeated information per chip by detecting presence of repeated cell aggregates.

Figure 12:
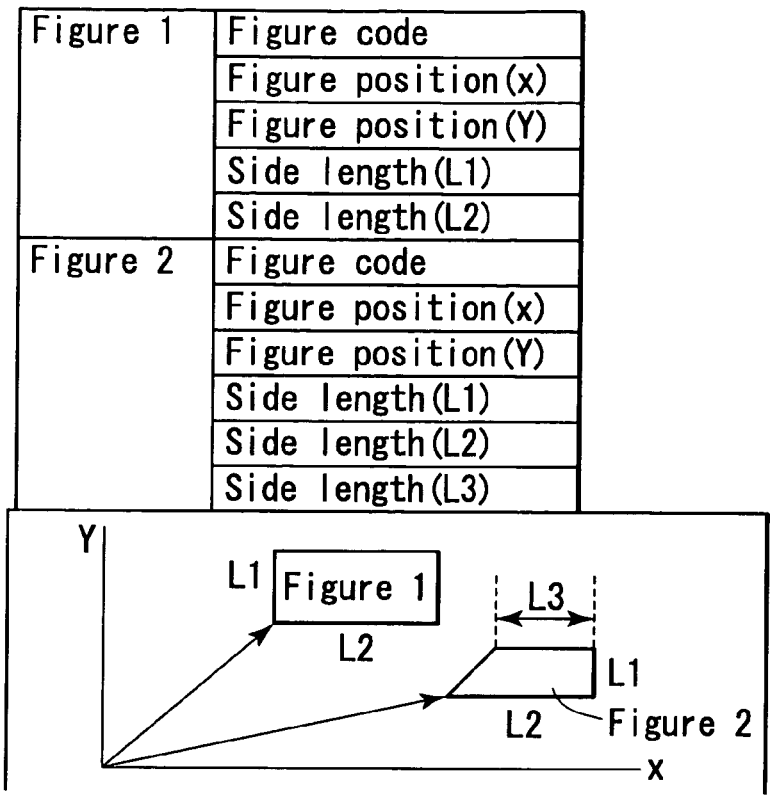
FIG. 12 is a conceptual view showing a figure code example.

In the designed pattern data used for database inspection, a figure is represented by a set of a figure code, a figure position and a figure side length as shown in FIG. 12. Since the designed pattern data contains accumulation of such figures, arrangement of figures where only figure positions are different, but figure codes and side lengths are similar can be extracted by searching for this figure data description.

Repeated figures extracted by the method includes both of repeated cells and repeated chips in the chip/cell configuration shown in FIGS. 3 and 4. Thus, a difference in regularity between a repeated cell cycle and a repeated chip cycle is read, and information of the die-to-die comparison method based on the repeated chips is extracted and reflected on the operation of the apparatus.

If the repeated cells are determined, the apparatus is set for die-to-die data comparison between the cells. These instructions are defined beforehand as apparatus parameters, or included in inspection conditions to be given to the apparatus.

Fourth Embodiment

The third embodiment has been described by way of a method which also analyzes the figure data of the destroyed hierarchy structure by the inspection apparatus, and repeatedly extracts and restores the information. However, in place of figure data analysis, the designed pattern data may be converted into a figure image to be temporarily stored in the pattern data memory or the like, and a method of extracting a feature of the figure image may be used to restore a feature of a repeated pattern.

Figure 13:
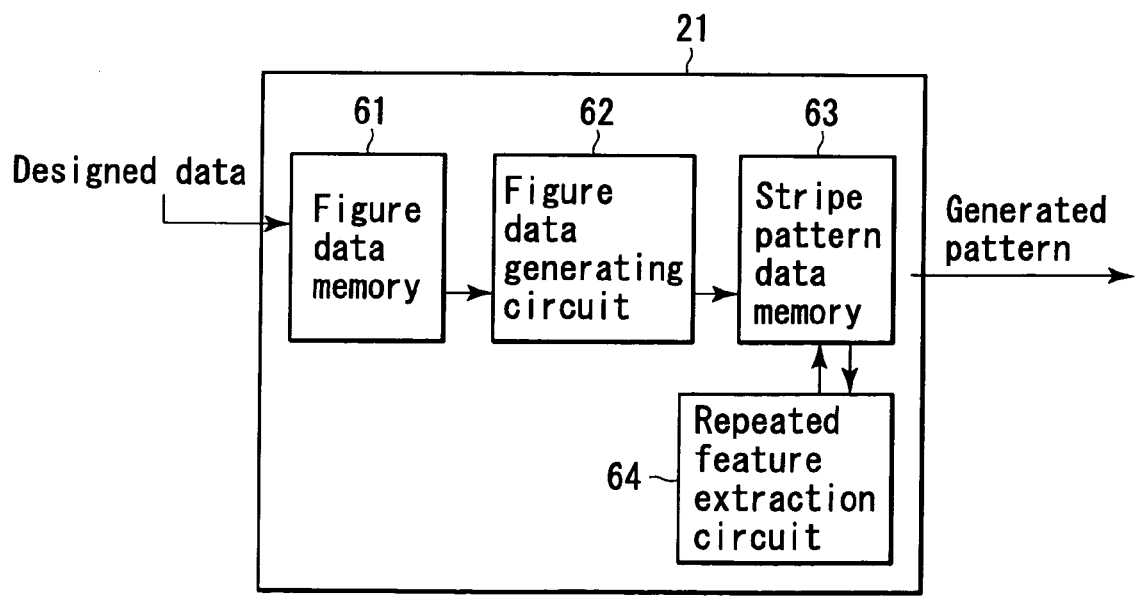
FIG. 13 is a block diagram showing a configuration of a data generation circuit used according to a fourth embodiment.

According to the embodiment, as shown in FIG. 13, a stripe pattern data memory 63 which can store a figure image of one stripe is prepared for a bit pattern data generation circuit 21. The bit pattern data generation circuit 21 further comprises a figure data memory 61 to which the designed pattern data is entered, a figure data bit pattern data generation circuit 62 which generates a figure pattern image from the figure data, and a repeated feature extraction circuit 64 which extracts repeated pattern features. The figure image generated by the figure data bit pattern data generation circuit 62 is stored in the stripe pattern data memory 63. For the figure data of one stripe stored in the stripe pattern data memory 63, the repeated feature extraction circuit 64 analyzes presence, the number and the pitch of repeated figures by a pattern matching method.

The pattern matching method holds a partial area of detected pattern data fetched into the pattern data memory 63 as a template, and scans the entire pattern data memory to compare the template with the fetched detected pattern. When the template is held, a coordinate of the template is also recorded. A stripe area is scanned 2-dimensionally and, when a pattern coincident with the template is detected, its coordinate is recorded.

Thus, even if the designed pattern data having no hierarchy descriptions is used as the inspection database, presence of a repeated pattern equivalent to a chip or a cell can be estimated from the coordinate recorded by the template scanning. A result of the analysis is sent to a computer 20, not shown, which carries out an operation of using in combination the die-to-die comparison method using repeated cells or chips and the die-do-database comparison method similar to those of the first to third embodiments.

The pattern generation by the bit pattern data generation circuit 21 is originally designed to generate inspection reference data for database inspection. Thus, during inspection, a dimension of one generated pixel is set very small in order to equally generate very small pattern shapes of the inspection reference data. However, if the purpose is to analyze the repeated feature of the figure pattern as in the case of the embodiment, since precision equal to that for the original inspection is not required, a dimension of one generated pixel is set slightly large to generate a rough pattern image, which creates no practical problems.

According to the embodiment, when the stripe pattern formation and the analysis to analyze an image are completed, a dimension of one pixel is returned to an original value for original database inspection, and inspection is started from a predetermined inspection start position.

Furthermore, a stripe position for the aforementioned analysis may be selected to be near a chip center in consideration that a chip peripheral portion has no repeatedly described cells as shown in FIG. 11. However, if a chip configuration is a 2×2 matrix, the center portion may reach a gap area called a peripheral pattern or dicing region having no repeated cells, creating a possibility of impossible analysis of a repeated configuration. Thus, it is practically effective to analyze the stripe in a position slightly shifted from the vicinity of the center.

Fifth Embodiment

In place of the repeated pattern feature extraction executed after the generation of the image data from the designed pattern data of the fourth embodiment, repeated pattern feature extraction may be carried out by using detected pattern data.

Figure 14:
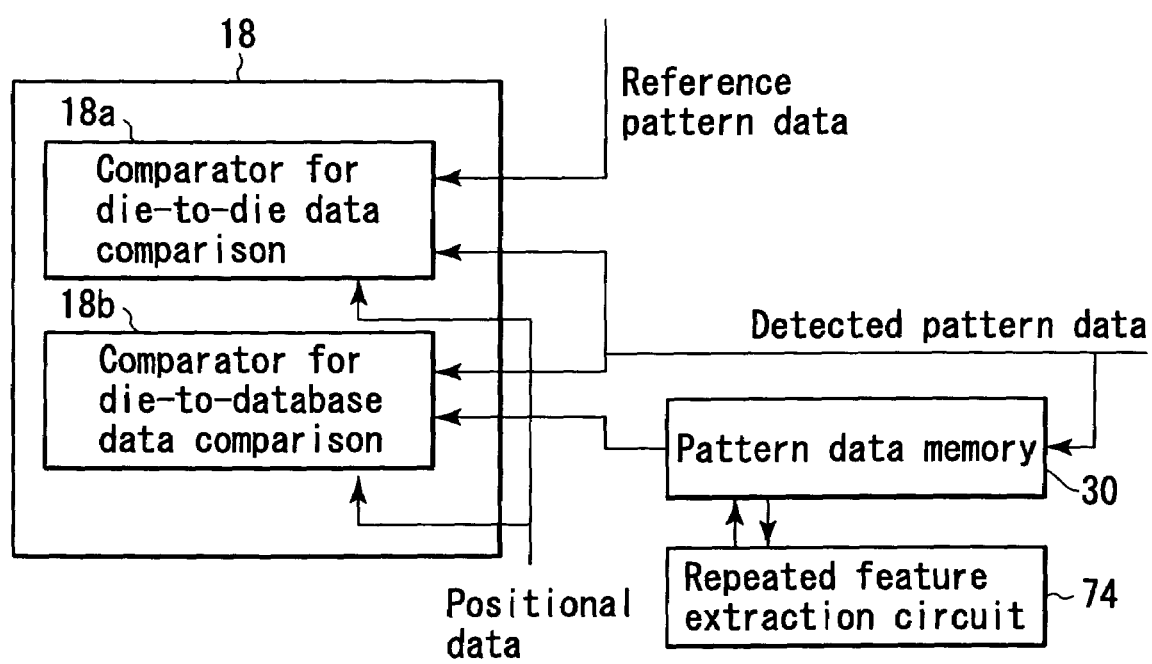
FIG. 14 is a block diagram showing a main part configuration of a fifth embodiment.

FIG. 14 is a block diagram showing a main part configuration of a pattern inspection apparatus according to a fifth embodiment of the present invention. A feature extraction circuit 74 similar to that of the fourth embodiment is disposed to extract a repeated feature from detected pattern data temporarily stored in a pattern data memory 30.

As shown in FIG. 14, pattern data fetched from a sensor is written in the pattern data memory 30, and data of one stripe is held. Based on the pattern data, the repeated feature extraction circuit 74 analyses presence, the number, and the pitch etc., of repeated figures by a pattern matching method. A result of the analysis, not shown, is sent to a computer 20, and an operation is carried out which uses in combination the die-to-die comparison method and the die-to-database comparison method using repeated cells or chips as in the case of the first to fifth embodiments.

Thus, according to the embodiment, in the case of executing repeated feature extraction based on the detected pattern data, a method may be employed which does not set a dimension of one pixel as small as in the case of the fourth embodiment, reduces a magnification rate in comparison with an original optical magnification, fetches a rough image, and extracts repeated cells or chips from the image.

MODIFICATION EXAMPLE

The present invention is not limited to each of the foregoing embodiments. Detection to obtain detected pattern data is not always limited to transmitted light, and reflected light may be used. Both of the transmitted light and the reflected light may be simultaneously used. Further, the number of photoelectric conversion parts may be plural.

Figure 15:
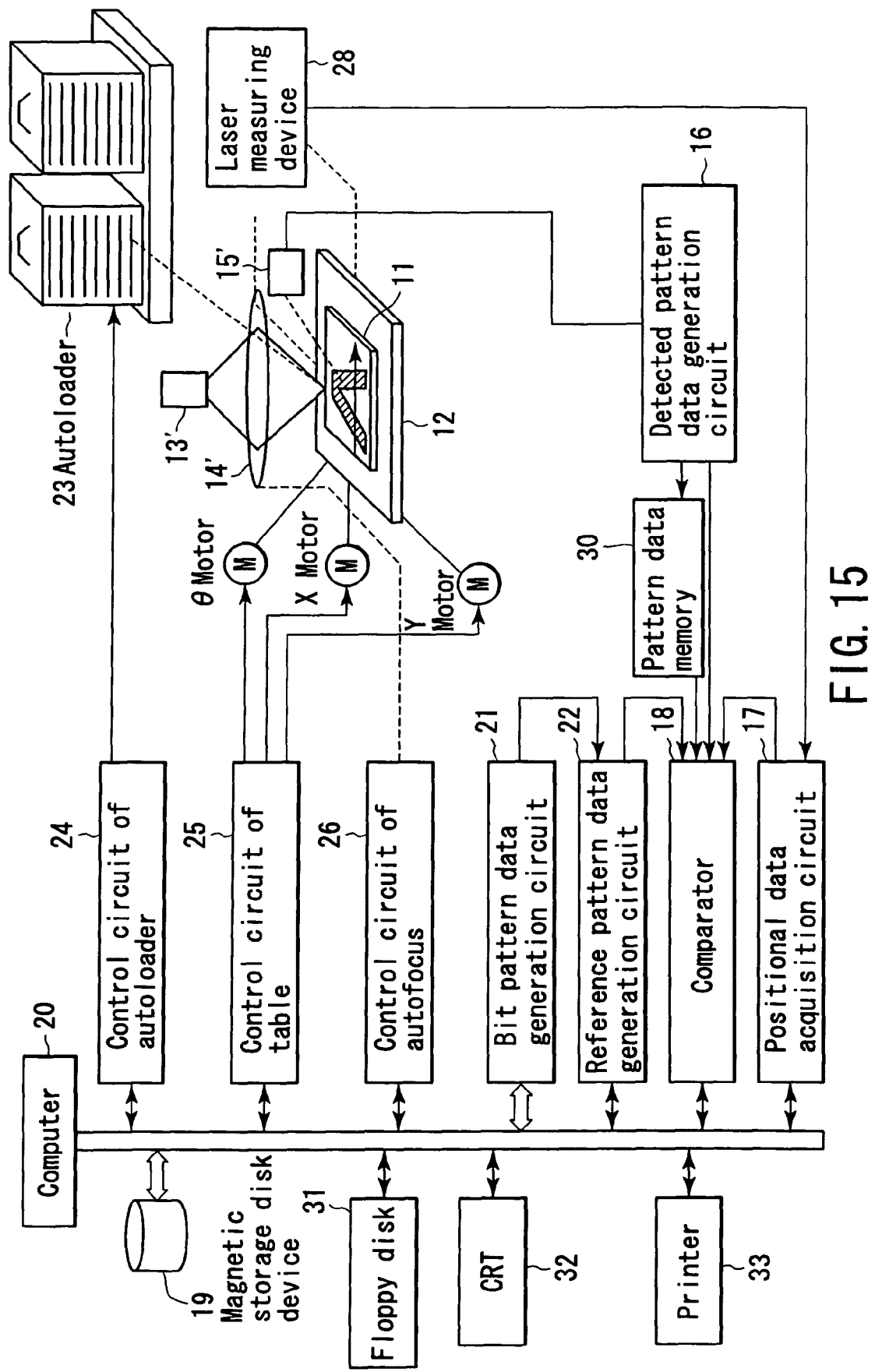
FIG. 15 is a schematic view of a pattern inspection apparatus according to a modification of the first embodiment.

A light source used for inspection is not limited to light, and an electron beam can be used as shown in FIG. 15. If the electron beam is used for the light source, secondary electrons may be detected in place of the reflected or transmitted light. In FIG. 15, a reference numeral 13' denotes an electron gun, 14' electron optics, and 15' a secondary electron detector.

An inspected sample is not limited to a photomask. The present invention can be applied to defect inspection of a very small pattern formed on a semiconductor substrate or a liquid crystal substrate.

As described above, according to the present invention, by reading the arranged state, the number, the dimension and the repeated pitch of repeated pattern areas necessary for the die-to-die comparison method from the designed pattern data or the detected pattern data within a predetermined range to automatically fetch the inspection area, it is possible to prevent operator's operation mistakes and setting variance in the die-to-die comparison method. Therefore, it is possible to improve operability and defect detection performance of the apparatus.

The embodiments of the present invention are summarized as follows.

(1) For the automatic fetching of the inspection area, presence of a plurality of repeated pattern areas is detected from the layout information contained in the designed pattern data, and the arranged state, the number, the dimension, and the repeated pitch of the repeated pattern areas are read.

More specifically, if data having a repeatedly described chip is contained in the designed pattern data in the mask inspection area formed of a plurality of chips, a method is employed which extracts a margin of each chip and a peripheral circuit region from the data, and reads the arranged state, the number, the dimension and the repeated pitch of chips necessary for the die-to-die comparison method to automatically fetch them into the operation conditions of the apparatus.

(2) For the automatic fetching of the inspection area, a predetermined pattern range is defined as a cell based on the hierarchy structure of the designed pattern data, the cell repeated description is extracted from the designed pattern data by using the cell repeated description to detect presence of the repeated cell, a start position and a finish position of the repeated cell are determined, presence of a plurality of starts/finishes thereof is detected, and the arranged state, the number, the dimension and the repeated pitch of the repeated cells are read.

More specifically, even if a plurality of chips are not arranged in a matrix, by using the hierarchy structure description of the designed pattern data for inspection, a mechanism which extracts a repeated pattern (cell) of a proper size, and a method which reads the arranged state, the number, the dimension and the repeated pitch of cells to enable comparative inspection of cells by the die-to-die comparison method from the extracted information to automatically fetch them into the operation conditions of the apparatus are employed.

(3) For the fetching of the inspection area, image data is generated in the pattern data memory based on the designed pattern data, image filtering is carried out to extract a repeated feature by pattern matching, and the arranged state, the number, the dimension and the repeated pitch of repeated subchips in one chip are read.

More specifically, even if the designed pattern data for inspection is not described in a hierarchy structure, upon instruction for repeated inspection, an image pattern which becomes an inspection reference is generated prior to real inspection, the pattern matching technology is applied to extract presence of repeated patterns, and a method which reads the arranged state, the number, the dimension and the repeated pitch for comparative inspection of detected pattern data by the die-to-die comparison method from the detected information to automatically fetch them into the operation conditions of the apparatus is employed.

(4) For the automatic fetching of the inspection area, image filtering is carried out to fetch a detected image of one stripe at a certain position of the sample, the detected image of one stripe is stored, and a repeated feature of the detected image is extracted, formation of a plurality of chips to be compared and inspected by the second comparator on the plate to be inspected is detected, and the arranged state, the number, the dimension and the repeated pitch of repeated subchips in one chip are read.

Alternatively, repeated cells in the chip may be detected, and the arranged state, the number, the dimension and the repeated pitch of cells may be read.

More specifically, even if no designed pattern data for inspection is prepared, a sensor image of one stripe is fetched at a certain position of the mask, the image of one stripe is stored, the pattern matching technology is applied to detect presence of repeated patterns, and a method which reads the arranged state, the number, the dimension, the repeated pitch etc., of cells to enable comparative inspection of cells by the die-to-die method from the detected information to fetch them into the operation conditions of the apparatus is employed.

(5) Both of die-to-die inspection and die-to-database inspection are executed for the same detected pattern area.

According to the present invention, if there is repeated chip description in the layout information contained in the designed pattern data, the arranged state, the number, the dimension and the repeated pitch of chips necessary for the die-to-die comparison method are read from the layout information, and the inspection area is automatically fetched in the die-to-die comparison method. Thus, even without teachings of the operator, defect inspection can be carried out by calibration, alignment, and the die-to-die comparison method. Therefore, operator's operation mistakes and setting variance in the die-to-die comparison method can be prevented to enable improvement of operability and inspection accuracy.

Even if there is no layout information, it is possible to read the arranged state, the number, the dimension, the repeated pitch etc., of chips necessary for the die-to-die data comparison method from the hierarchy structure of the designed pattern data. Moreover, if there is no hierarchy structure in the designed pattern data, by saving the image data roughly converted based on the designed pattern data in the pattern data memory, and extracting the repeated feature by the image filtering, it is possible to read the arranged state, the number, the dimension, and the repeated pitch of repeated subchips in one chip.

Furthermore, without using the designed pattern data, by fetching the detected pattern data of one stripe at a certain position of the plate to be inspected, and carrying out the image filtering to extract the repeated feature of the detected image, it is possible to read the arranged state, the number, the dimension, the repeated pitch etc., of repeated subchips in a chip.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pattern inspection apparatus comprising:
   imaging optics which forms an optical image of a pattern formed on a plate to be inspected based on designed pattern data;
   a detected pattern data generator which detects the optical image to generate detected pattern data;
   a reference pattern data generator which generates first reference pattern data from the designed pattern data, the first reference pattern data being a reference data corresponding to the detected pattern data;
   a first comparator which compares the detected pattern data with the first reference pattern data to detect a defect of the pattern formed on the plate;
   a first memory which, when there are a plurality of repeated pattern areas on the plate, stores pattern data obtained by detecting an inspection area, which is one of the plurality of repeated pattern areas, as second reference pattern data;
   a second comparator which compares the detected pattern data with the second reference pattern data to detect the defect of the pattern formed on the plate; and
   a computer which reads an arrangement, a number, a dimension and a repeated pitch of the plurality of repeated pattern areas from the designed pattern data, and stores the inspection area as a basis of the second reference pattern data.

2. The pattern inspection apparatus according to claim 1, wherein the computer detects presence of the plurality of repeated pattern areas from layout information contained in the designed pattern data, and reads the arrangement, the number, the dimension and the repeated pitch of the plurality of the repeated pattern areas.

3. The pattern inspection apparatus according to claim 1, wherein the computer defines a fixed pattern range as a cell from description of the designed pattern data, detects start positions and finish positions of a plurality of repeated cells from repeated description of the cell, and reads an arrangement, a number, a dimension and a repeated pitch of the plurality of repeated cells.

4. The pattern inspection apparatus according to claim 1, wherein the computer saves the designed pattern data as an image, extracts a repeated feature by pattern matching to detect presence of a plurality of repeated subchips in one chip, and reads an arrangement, a number, a dimension and a repeated pitch of the plurality of repeated subchips.

5. The pattern inspection apparatus according to claim 4, wherein the computer saves the designed pattern data as the image by generating bit pattern data on a pattern memory based on the designed pattern data.

6. The pattern inspection apparatus according to claim 1, wherein comparison is carried out for the same detected pattern area by using both of the first and second comparators.

7. The pattern inspection apparatus according to claim 1,
   wherein detected pattern data of a first detected area generated by the detected pattern data generator is sent to the first comparator and the first memory;
   the first comparator compares the detected pattern data of the first detected area with reference pattern data of the first detected area generated by the reference pattern data generator;
   detected pattern data of a second detected area generated by the detected pattern data generator is sent to the first and second comparators, after detecting the pattern data of the first detected area;
   the first comparator compares the detected pattern data of the second detected area with reference pattern data of the second detected area generated by the reference pattern data generator; and
   the second comparator compares the detected pattern data of the second detected area with the detected pattern data of the first detected area stored in the first memory.

8. The pattern inspection apparatus according to claim 7,
   wherein detected pattern data of a third detected area generated by the detected pattern data generator after the detected pattern data of the second detected area is sent to the first and second comparators;
   the first comparator compares the detected pattern data of the third detected area with reference pattern data of the third detected area generated by the reference pattern data generator; and
   the second comparator compares the detected pattern data of the third detected area with the detected pattern data of the first detected area stored in the first memory.

9. The pattern inspection apparatus according to claim 1, wherein the reference pattern data generator has a second memory;
   the detected pattern data of the first and second detected areas generated by the detected pattern data generator are sent to the first and second memories;
   the first comparator compares the detected pattern data of the first and second detected areas with the reference pattern data of the first and second detected areas generated by the reference pattern data generator; and
   the second comparator compares the detected pattern data of the first and second detected areas stored in the first memory and the second memory with each other.

* * * * *